(12) United States Patent
Kim et al.

(10) Patent No.: US 11,554,830 B2
(45) Date of Patent: Jan. 17, 2023

(54) PERSONAL MOBILITY AND CONTROL METHOD THEREOF

(71) Applicants: Hyundai Motor Company, Seoul (KR); Kia Corporation, Seoul (KR)

(72) Inventors: Soobin Kim, Seoul (KR); Rowoon An, Seoul (KR); Ilsun Song, Seongnam-si (KR); Jae Yul Woo, Seoul (KR); Seunghyun Woo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/475,694

(22) Filed: Sep. 15, 2021

(65) Prior Publication Data

US 2022/0161888 A1    May 26, 2022

(30) Foreign Application Priority Data

Nov. 26, 2020   (KR) .................. 10-2020-0161647

(51) Int. Cl.
| | |
|---|---|
| *B62K 21/18* | (2006.01) |
| *B62K 21/12* | (2006.01) |
| *G06V 40/10* | (2022.01) |
| *B60W 40/08* | (2012.01) |
| *B62K 21/22* | (2006.01) |
| *B62K 21/16* | (2006.01) |
| *B62K 3/00* | (2006.01) |

(52) U.S. Cl.
CPC ............. *B62K 21/22* (2013.01); *B62K 21/16* (2013.01); *G06V 40/103* (2022.01); *B60W 2040/0809* (2013.01); *B62K 3/002* (2013.01)

(58) Field of Classification Search
CPC ........ B62K 3/002; B62K 17/00; B62K 21/16; B62K 23/02; B62K 21/22; B60W 2040/0809; B60W 2040/0872; B60W 2420/42; B62J 45/40; B62J 45/416; G06Q 50/30; G06V 40/10; G06V 40/103; G07C 9/00563
See application file for complete search history.

(56) References Cited

U.S. PATENT DOCUMENTS

| | | | | |
|---|---|---|---|---|
| 11,084,400 | B2* | 8/2021 | Shen ................ | G07C 9/00896 |
| 11,136,083 | B2* | 10/2021 | Shirai .................. | B62K 25/08 |
| 11,180,211 | B2* | 11/2021 | Hara .................... | B62K 19/36 |
| 2016/0001782 | A1* | 1/2016 | Fiedler ................. | B60W 40/09 |
| | | | | 340/5.81 |
| 2019/0084639 | A1* | 3/2019 | Toyota ................... | B62D 5/04 |
| 2019/0318181 | A1* | 10/2019 | Katz ...................... | B60W 40/09 |
| 2021/0323623 | A1* | 10/2021 | Anderson ............. | B62K 21/22 |
| 2022/0097793 | A1* | 3/2022 | Song ..................... | B62K 19/36 |
| 2022/0161887 | A1* | 5/2022 | An ........................ | B62K 11/14 |

FOREIGN PATENT DOCUMENTS

| | | | | |
|---|---|---|---|---|
| CN | 109145750 | A * | 1/2019 | |
| CN | 113998046 | A * | 2/2022 | |
| DE | 19946100 | A1 * | 4/2001 | ............ B62K 11/14 |
| TW | I287519 | B * | 10/2007 | |

\* cited by examiner

*Primary Examiner* — Adam D Rogers
(74) *Attorney, Agent, or Firm* — Slater Matsil, LLP

(57) ABSTRACT

An embodiment personal mobility includes a height adjustment device configured to adjust a height of a steering handle, an image sensor configured to measure user body information, and a controller configured to control the height adjustment device to adjust the height of the steering handle based on the user body information measured by the image sensor.

19 Claims, 16 Drawing Sheets

PERSONAL MOBILITY AND CONTROL METHOD THEREOF

CROSS-REFERENCE TO RELATED APPLICATIONS

This application claims the benefit of Korean Patent Application No. 10-2020-0161647, filed on Nov. 26, 2020, which application is hereby incorporated herein by reference.

TECHNICAL FIELD

The disclosure relates to a personal mobility device and a control method thereof.

BACKGROUND

Recently, a sharing service using a personal mobility device, such as an electric bicycle and an electric scooter, has been developed. The reason for this is because when it is too close to move by a vehicle but difficult to move by walking, a user may move conveniently without difficulty by using an electric bicycle or the like.

However, in a typical personal mobility device, a height of a steering handle is fixed in consideration of an average height of users, whereas physical conditions of users who rent a personal mobility device are diverse. Therefore, it may be inconvenient for users who are relatively tall or short to rent and use a personal mobility device.

SUMMARY

The disclosure relates to a personal mobility device and a control method thereof. Particular embodiments relate to a personal mobility device having a steering handle height adjustment function and a control method thereof.

An embodiment of the disclosure provides a personal mobility device capable of adjusting a height of a steering handle depending on a physical condition of a user, and a control method thereof.

Additional embodiments of the disclosure will be set forth in part in the description which follows and, in part, will be obvious from the description, or may be learned by practice of the disclosure.

In accordance with an embodiment of the disclosure, a personal mobility device includes a height adjustment device configured to adjust a height of a steering handle, an image sensor provided to measure user body information, and a controller configured to control the height adjustment device to adjust the height of the steering handle depending on the user body information measured by the image sensor.

When the user body information is transmitted from a control server through authentication, the controller may control the height adjustment device to adjust the height of the steering handle according to the transmitted user body information.

In accordance with an embodiment of the disclosure, a personal mobility device includes a height adjustment device configured to adjust a height of a steering handle, a wireless communication module provided to communicate with a control server through a wireless network, and a controller configured to control the height adjustment device to adjust the height of the steering handle depending on user body information transmitted from the control server through authentication.

The height adjustment device may include a lower steering shaft connected to a front wheel side, an upper steering shaft disposed above the lower steering shaft to enable lifting and having an upper end to which the steering handle is connected, and a lifting driving device installed at connection portions between the lower steering shaft and the upper steering shaft to ascend and descend the upper steering shaft.

The lifting driving device may include a lifting screw shaft located in the upper steering shaft to be screwed to the upper steering shaft, and a lifting motor installed on the lower steering shaft to rotate the lifting screw shaft in a forward or reverse direction.

In accordance with an embodiment of the disclosure, a control method of a personal mobility device, which includes a height adjustment device to adjust a height of a steering handle and an image sensor to measure user body information, includes determining whether a user is authenticated, measuring user body information with the image sensor when the user is authenticated, and controlling the height adjustment device to adjust the height of the steering handle depending on the user body information measured by the image sensor.

In accordance with an embodiment of the disclosure, a control method of a personal mobility device, which includes a height adjustment device to adjust a height of a steering handle and a wireless communication module provided to communicate with a control server through a wireless network, includes determining whether a user is authenticated through communication with the control server, determining whether there is user body information input by the user when the user is authenticated, and controlling the height adjustment device to adjust the height of the steering handle depending on the user body information input by the user when there is the user body information input by the user.

The personal mobility device may further include an image sensor to measure the user body information, and the determining of whether there is the user body information input by the user may include measuring the user body information with the image sensor when there is no user body information input by the user, and controlling the height adjustment device to adjust the height of the steering handle depending on the user body information measured by the image sensor.

In accordance with an aspect of the disclosure, a personal mobility device includes a lower steering shaft connected to a front wheel side, an upper steering shaft having a lower side connected to the lower steering shaft and an upper side connected to a steering handle, and a height adjustment device configured to rotatably connect a lower end of the upper steering shaft to an upper end of the lower steering shaft, the height adjustment device allowing rotation of the upper steering shaft or limiting the rotation of the upper steering shaft to adjust a height of the steering handle.

The height adjustment device may include a first rotational connection part provided on one of the lower steering shaft and the upper steering shaft, a second rotational connection part provided on the other of the lower steering shaft and the upper steering shaft and having one side surface in contact with a side surface of the first rotational connection part, a connection shaft provided to rotatably fasten the first rotational connection part and the second rotational connection part and having an axis intersecting an axis of the lower steering shaft, a plurality of locking balls interposed between the first rotational connection part and the second rotational connection part, a plurality of restraining grooves formed in a hemispherical shape on the side surface of the first rotational connection part to accommodate and restrain a portion of the plurality of locking balls, respectively, a plurality of ball accommodating grooves formed on the second rotational connection part at positions corresponding to the plurality of restraining grooves to accommodate the plurality of locking balls to be movable forward and backward, respectively, a plurality of pressing springs installed in the plurality of ball accommodating grooves to press the plurality of locking balls toward the plurality of restraining grooves, respectively, a plurality of pressing pins installed in the first rotational connection part to push and move the plurality of locking balls located in the plurality of restraining grooves toward the plurality of ball accommodating grooves, respectively, the plurality of pressing pins having one end extending to the outside of the first rotational connection part, and a pressing member coupled to the ends of the plurality of pressing pins.

The height adjustment device may include a first rotational connection part provided on one of the lower steering shaft and the upper steering shaft, a second rotational connection part provided on the other of the lower steering shaft and the upper steering shaft and having one side surface in contact with a side surface of the first rotational connection part, a connection shaft provided to rotatably fasten the first rotational connection part and the second rotational connection part and having an axis intersecting an axis of the lower steering shaft, a circular fluid accommodating groove formed on the side surface of the first rotational connection part such that a side thereof facing the side surface of the second rotational connection part is open and having a center coincident with a center of the connection shaft, a magneto-rheological (MR) fluid accommodated in the fluid accommodating groove, a plurality of protrusions protruding from the second rotational connection part to enter the fluid accommodating groove, and an excitation coil provided on the first rotational connection part to provide a magnetic field to the MR fluid.

The MR fluid may change into a solid property to limit the movement of the plurality of protrusions when power is applied to the excitation coil to generate a magnetic field.

In accordance with an embodiment of the disclosure, a personal mobility device includes a guide rail fixed to an upper portion of a steering shaft and having a sliding groove formed in a vertical direction, a lifting member coupled to the guide rail to ascend and descend along the sliding groove, a steering handle extending to opposite sides of the lifting member in a state of penetrating through the lifting member in a transverse direction to be rotatably supported on the lifting member, a plurality of locking grooves formed on an inner surface of the sliding groove in contact with a side surface of the lifting member to be spaced apart from each other in the vertical direction, a cam groove formed on an outer surface of the steering handle inside the lifting member, a locking member installed on the lifting member to be movable forward and backward to be caught in one of the plurality of locking grooves and having one end in contact with the cam groove, the locking member moving forward and backward by the rotation of the steering handle, a first restoration spring installed outside the locking member to move the locking member toward the steering handle, and a second restoration spring installed between the lifting member and the steering handle to rotate the steering handle in a direction of protruding the locking member.

The personal mobility device may further include a first traction spring provided to connect an upper side of the guide rail and the lifting member to pull the lifting member upward, and a second traction spring provided to connect a lower side of the guide rail and the lifting member to pull the lifting member downward.

BRIEF DESCRIPTION OF THE DRAWINGS

These and/or other features of embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
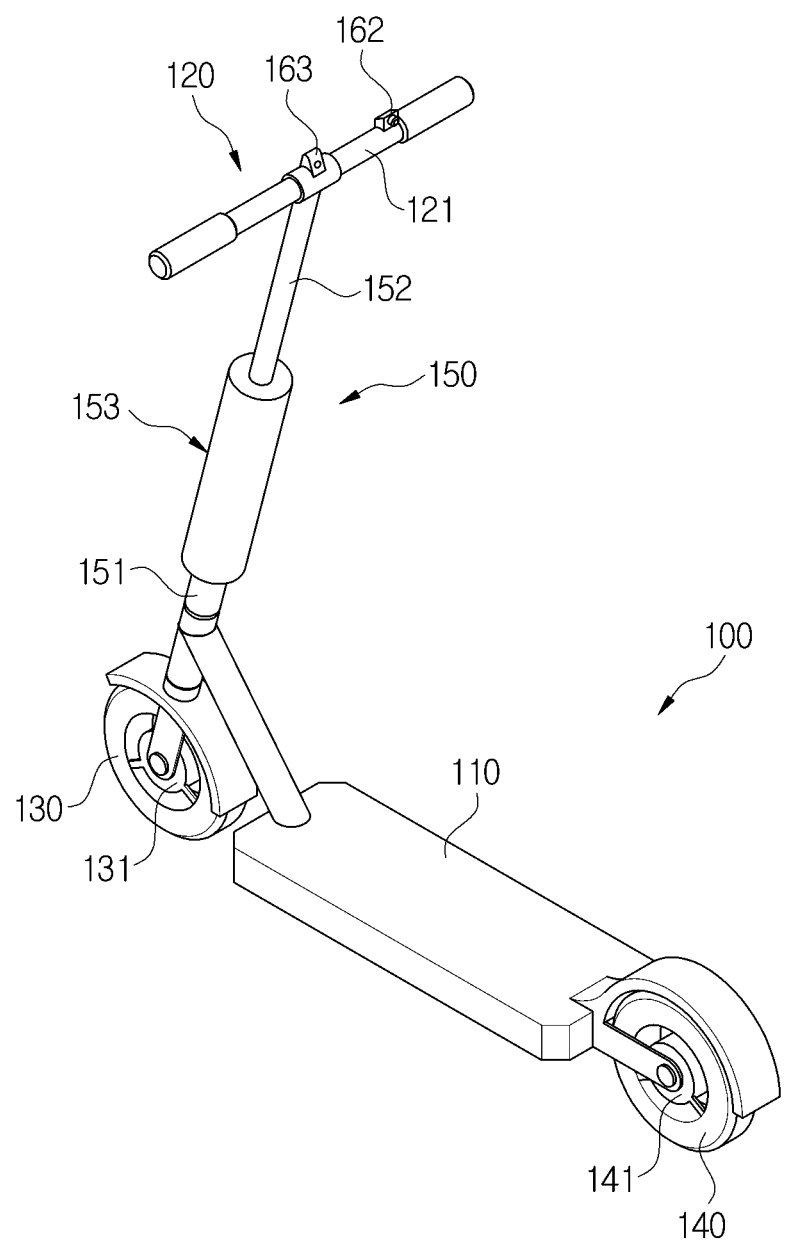
FIG. 1 illustrates a personal mobility device according to a first embodiment of the disclosure.
Figure 2:
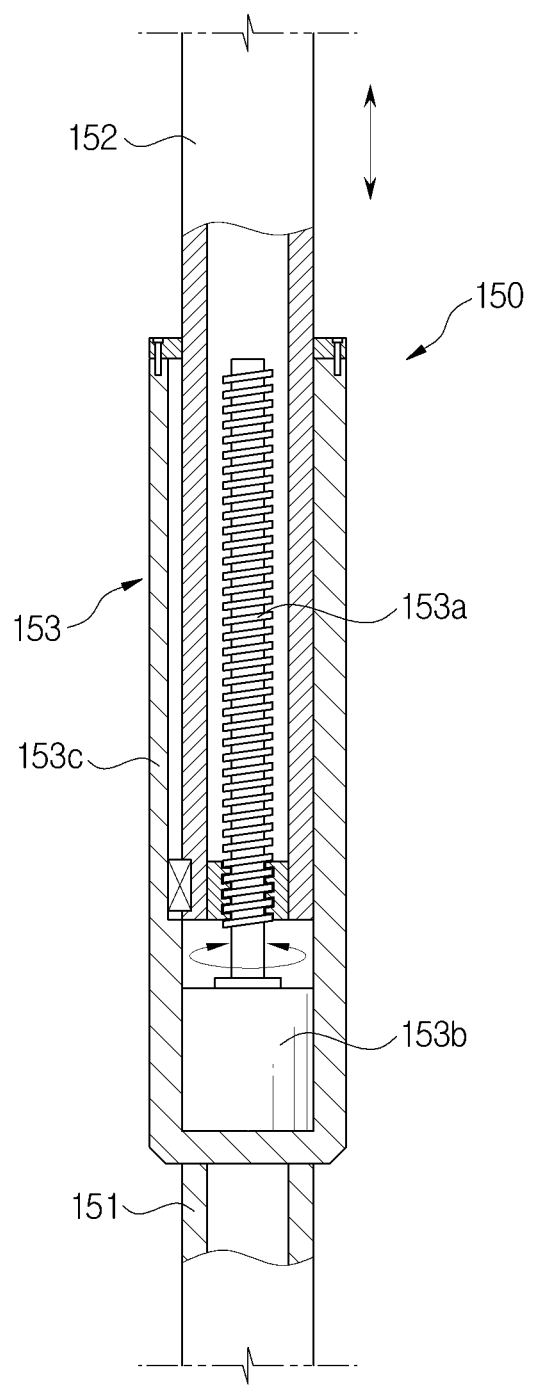
FIG. 2 is a cross-sectional view of a height adjustment device of the personal mobility device according to the first embodiment of the disclosure.

Referring to FIGS. 1 and 2, a personal mobility device 100 according to a first embodiment of the disclosure may include a main body 110, a steering device 120 provided in front of the main body 110, a front wheel 130 installed at a lower end of the steering device 120, and rear wheel 140 installed at a rear end of the main body 110.

The front wheel 130 and the rear wheel 140 may include wheel driving motors 131 and 141 for driving and braking devices for braking, respectively. The main body no may include a battery for supplying power to the wheel driving motors 131 and 141 of the front wheel 130 and the rear wheel 140.

The steering device 120 includes a steering handle 121 extending in a transverse direction and a height adjustment device 150 capable of adjusting a height of the steering handle 121. The height adjustment device 150 includes a lower steering shaft 151 rotatably installed at a front end of the main body no and connected to the front wheel 130 side, an upper steering shaft 152 disposed above the lower steering shaft 151 to enable lifting and having an upper end to which the steering handle 121 is connected, and a lifting driving device 153 installed at connection portions of the lower steering shaft 151 and the upper steering shaft 152 to ascend and descend the upper steering shaft.

As illustrated in FIG. 2, the lifting driving device 153 includes a lifting screw shaft 153a positioned within the upper steering shaft 152 to be screwed to the upper steering shaft 152, and a lifting motor 153b fixed to the lower steering shaft 151 to rotate the lifting screw shaft 153a in a forward or reverse direction. The upper steering shaft 152 may be installed such that a lower portion thereof enters the inside of a cylindrical case 153c fixed to an upper side of the lower steering shaft 151 and may be installed to ascend and descend in the cylindrical case 153c in a state in which rotation thereof is restricted.

The lifting driving device 153 may ascend or descend the upper steering shaft 152 by rotating the lifting screw shaft 153a in the forward or reverse direction by the operation of the lifting motor 153b, thereby the height of the steering handle 121 may be adjusted.

Figure 3:
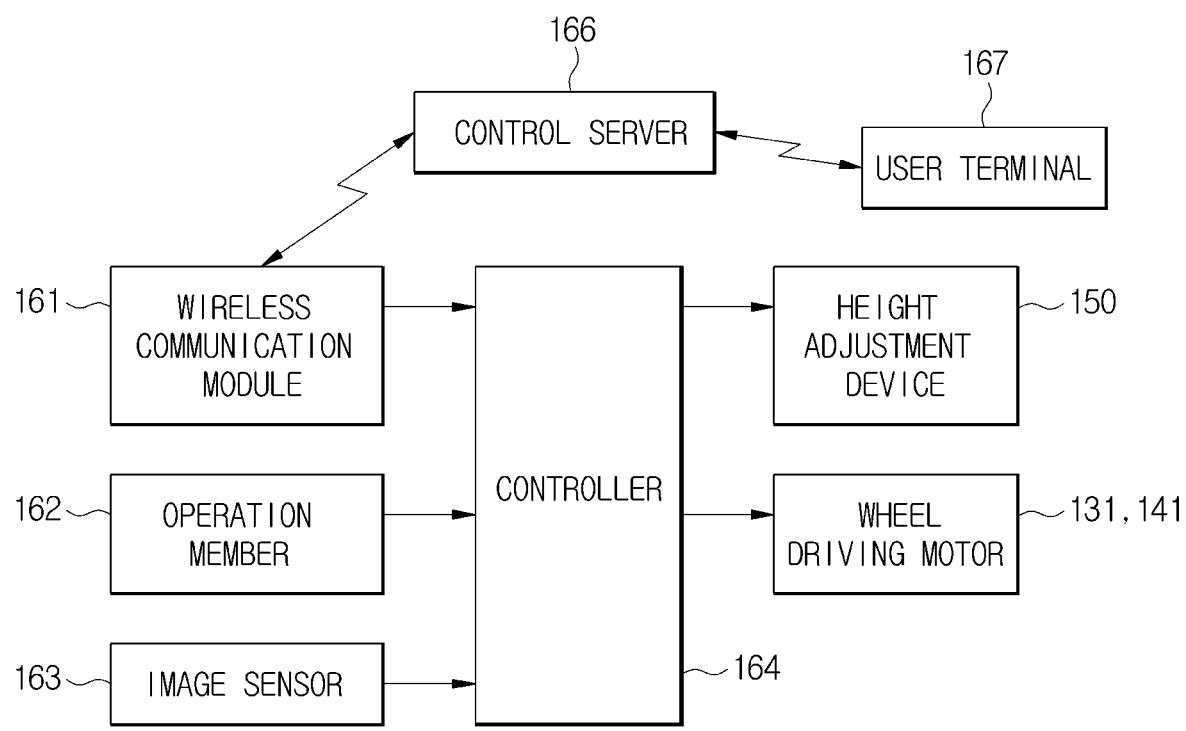
FIG. 3 is a control block diagram of the personal mobility device according to the first embodiment of the disclosure.

Referring to FIG. 3, the personal mobility device 100 of the first embodiment may include a wireless communication module 161, an operation member 162, an image sensor 163, and a controller 164.

The wireless communication module 161 may communicate with a control server 166 through a wireless network. The wireless communication module 161 may transmit information transmitted from the control server 166 to the controller 164 or may transmit information from the controller 164 to the control server 166.

A user who wants to rent and use the personal mobility device wo may request user authentication from the control server 166 through a user terminal 167, and the control server 166 may transmit information on whether to use authentication or not to the controller 164 of the corresponding personal mobility device wo in consideration of member information, payment information, and the like.

The user may input user body information such as height and weight of the user into the user terminal 167 and transmit the user body information to the control server 166, and the controller 164 may control the operation of the height adjustment device 150 to adjust the height of the steering handle 121 depending of the user body information transmitted from the control server 166. The user terminal 167 may be a smart phone installed with a service application (APP) or various mobile terminals capable of wireless communication.

The operation member 162 may be provided on the steering handle 121 and the like and transmits information input by a user manipulation to the controller 164. The user may control the overall operation of the personal mobility device wo by manipulating the operation member 162.

The image sensor 163 may measure the user body information by photographing a whole body of the user when the use of the personal mobility device wo is authenticated. As illustrated in FIG. 1, the image sensor 163 may be provided on the steering handle 121 to easily photograph the whole body of the user.

The controller 164 may control the operation of the height adjustment device 150 to adjust the height of the steering handle 121 depending on body information such as a height measured by the image sensor 163. In addition, the controller 164 may control the operation of the wheel driving motors 131 and 141 and the braking device in relation to the driving of the personal mobility device 100.

Hereinafter, a control method of the personal mobility device wo according to the first embodiment will be described with reference to the flowcharts of FIGS. 4 to 6.

Figure 4:
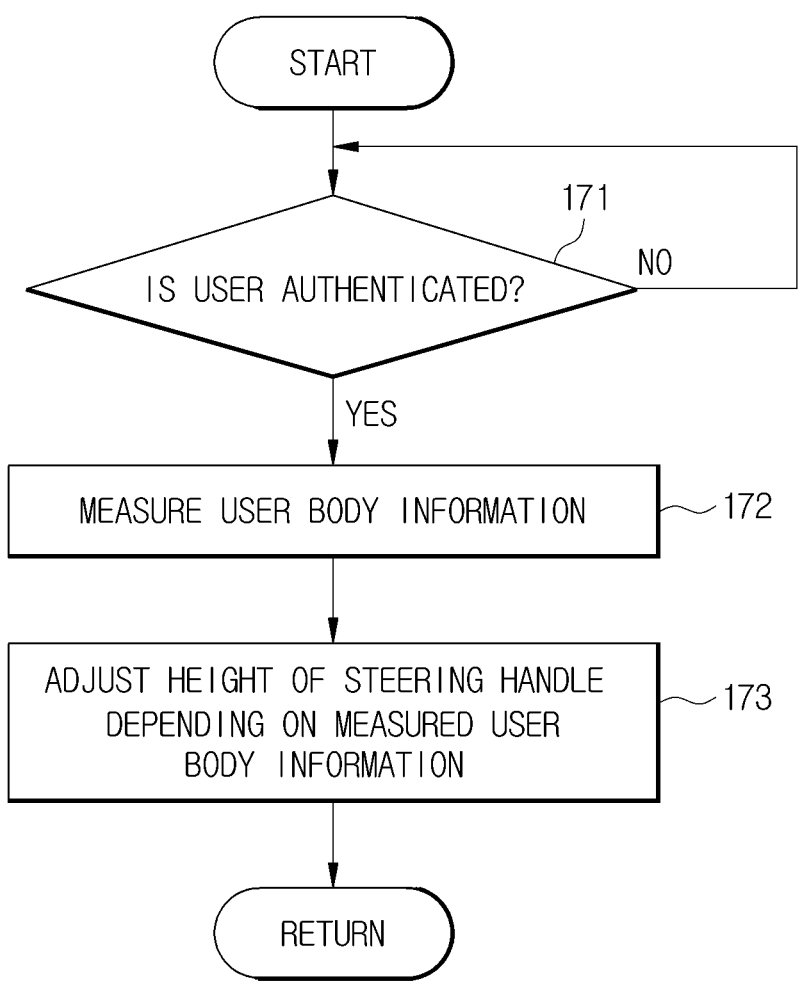
FIGS. 4 to 6 are flowcharts of a control method of the personal mobility device according to the first embodiment of the disclosure.

Referring to FIG. 4, in the personal mobility device 100 of the first embodiment, the image sensor 163 may measure user body information and adjust the height of the steering handle 121 depending on the measured user body information. In this case, the controller 164 determines whether the user is authenticated (171), and controls the image sensor 163 to measure user body information such as a height of the user when it is determined that the user is authenticated (172).

Thereafter, the controller 164 controls the operation of the height adjustment device 150 to adjust the height of the steering handle 121 depending on the user body information measured by the image sensor 163 (173). In process 173, the controller 164 may determine whether the height of the steering handle 121 is appropriate by comparing the information measured by the image sensor 163 with the data stored therein and control the height adjustment device 150 to appropriately adjust the height of the steering handle 121 in consideration of a physical condition of the user.

Figure 5:
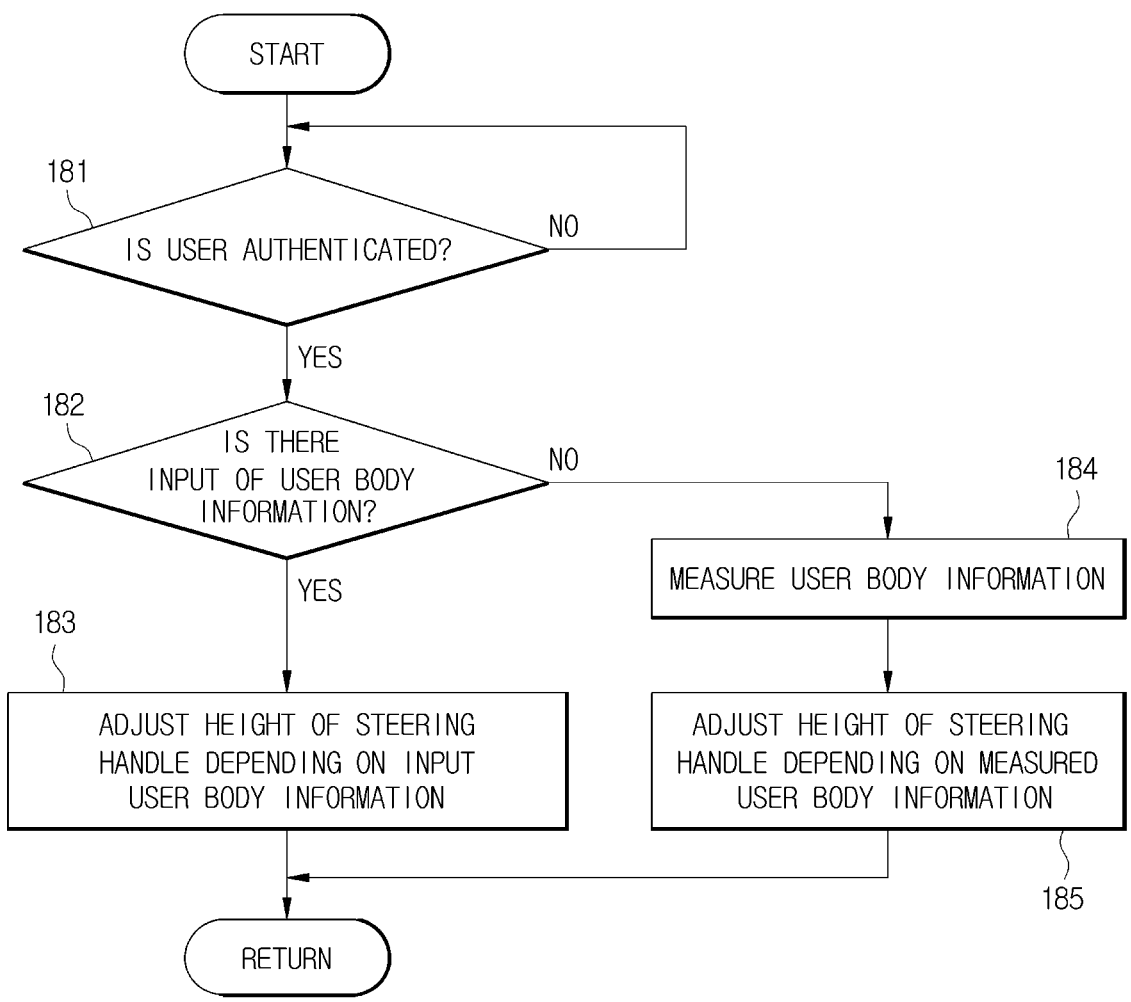

FIG. 5 is a modified example of the control method. Referring to FIG. 5, in the personal mobility device 100 of the first embodiment, when the user inputs user body information such as a height through the user terminal 167, the height of the steering handle 121 may be adjusted depending on the input user body information. In this case, the controller 164 determines whether the user is authenticated (181), and determines whether there is an input of user body information when it is determined that the user is authenticated (182). That is, in process 182, the controller 164 determines whether there is user body information in the information transmitted from the control server 166 (182).

When it is determined in process 182 that there is user body information input by the user, the controller 164 controls the height adjustment device 150 to adjust the height of the steering handle 121 depending on the user body information input by the user (183).

When it is determined in process 182 that there is no user body information input by the user, the controller 164 controls the image sensor 163 to measure user body information such as the height of the user (184), and controls the height adjustment device 150 to adjust the height of the steering handle 121 depending on the user body information measured by the image sensor 163 (185).

Figure 6:
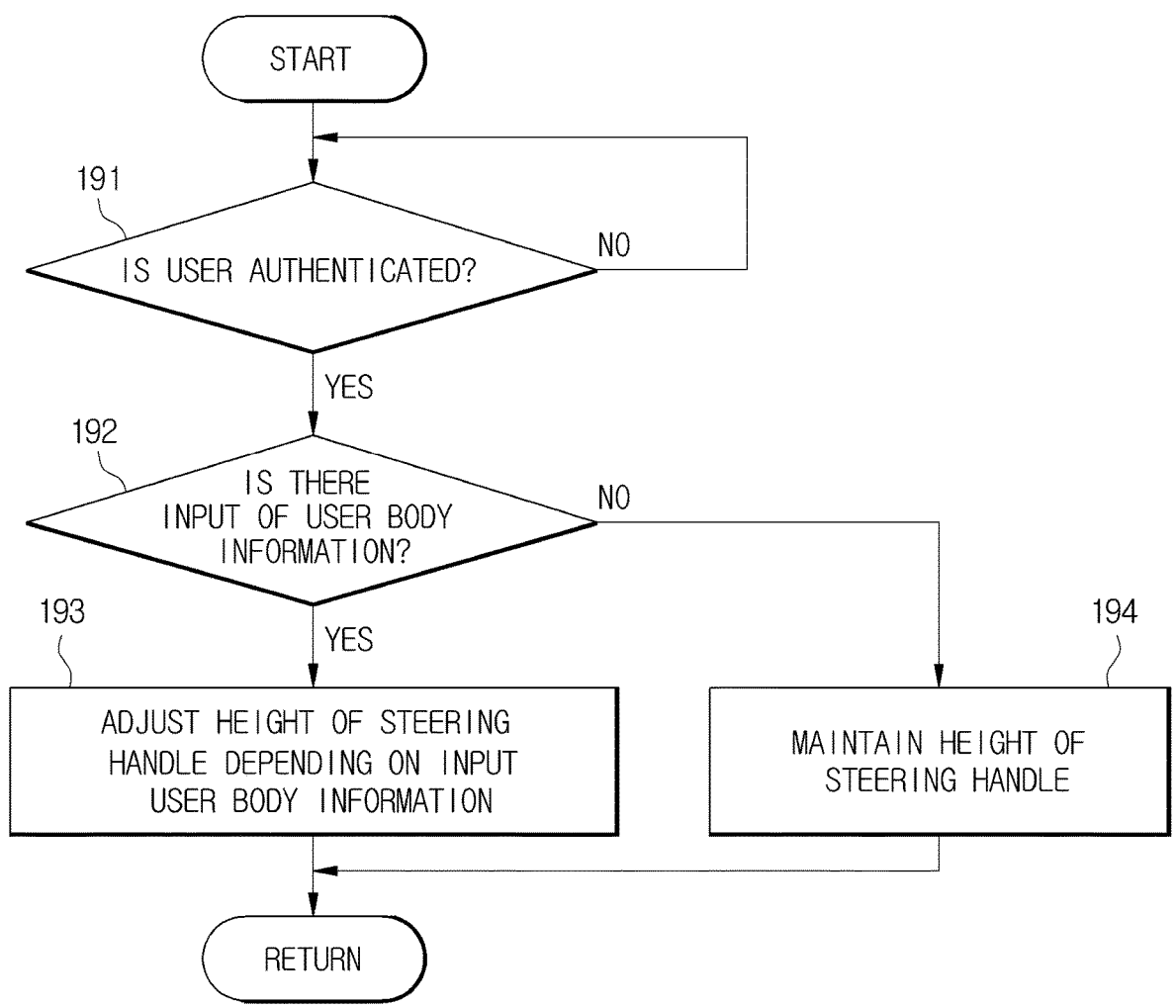

FIG. 6 is another modified example of the control method. Referring to FIG. 6, in the personal mobility device 100 of the first embodiment, the height of the steering handle 121 may be adjusted only with user body information input by the user into the user terminal 167 in a state in which measurement through the image sensor 163 is excluded. In this case, the controller 164 determines whether the user is authenticated (191), and determines whether there is an input of user body information when it is determined that the user is authenticated (192).

When is determined in process 192 that there is user body information input by the user, the controller 164 controls the height adjustment device 150 to adjust the height of the steering handle 121 depending on the user body information input by the user (193). When it is determined in process 192 that there is no user body information input by the user, the controller 164 controls to maintain the height of the steering handle 121 as it is (194).

As such, the personal mobility device wo according to the first embodiment may be used safely and conveniently because the height of the steering handle 121 is automatically adjusted according to the physical condition of the user.

FIGS. 7 to 10 illustrate a personal mobility device 200 according to a second embodiment of the disclosure.

Figure 7:
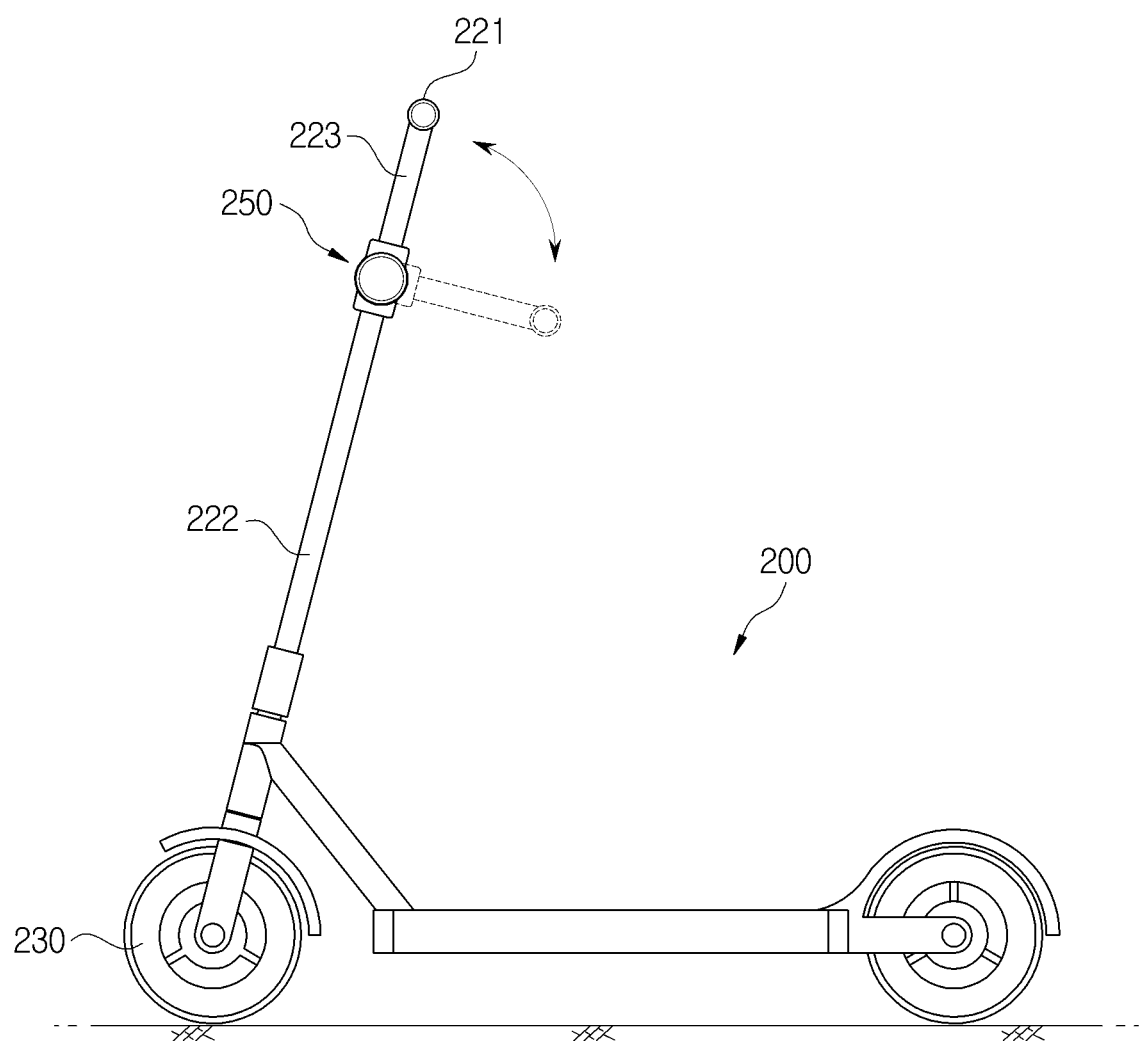
FIG. 7 illustrates a personal mobility device according to a second embodiment of the disclosure.

As illustrated in FIG. 7, the personal mobility device 200 of the second embodiment includes a lower steering shaft 222 connected to a front wheel 230 side, an upper steering shaft 223 having a lower side connected to the lower steering shaft 222 and an upper side connected to a steering handle 221, and a height adjustment device 250 provided on connection portions of the upper steering shaft 223 and the lower steering shaft 222 for height adjustment of the steering handle 221.

The height adjustment device 250 rotatably connects a lower end of the upper steering shaft 223 to an upper end of the lower steering shaft 222 and may adjust the height of the steering handle 221 by rotating the upper steering shaft 223 up and down by the manual operation of the user.

Figure 8:
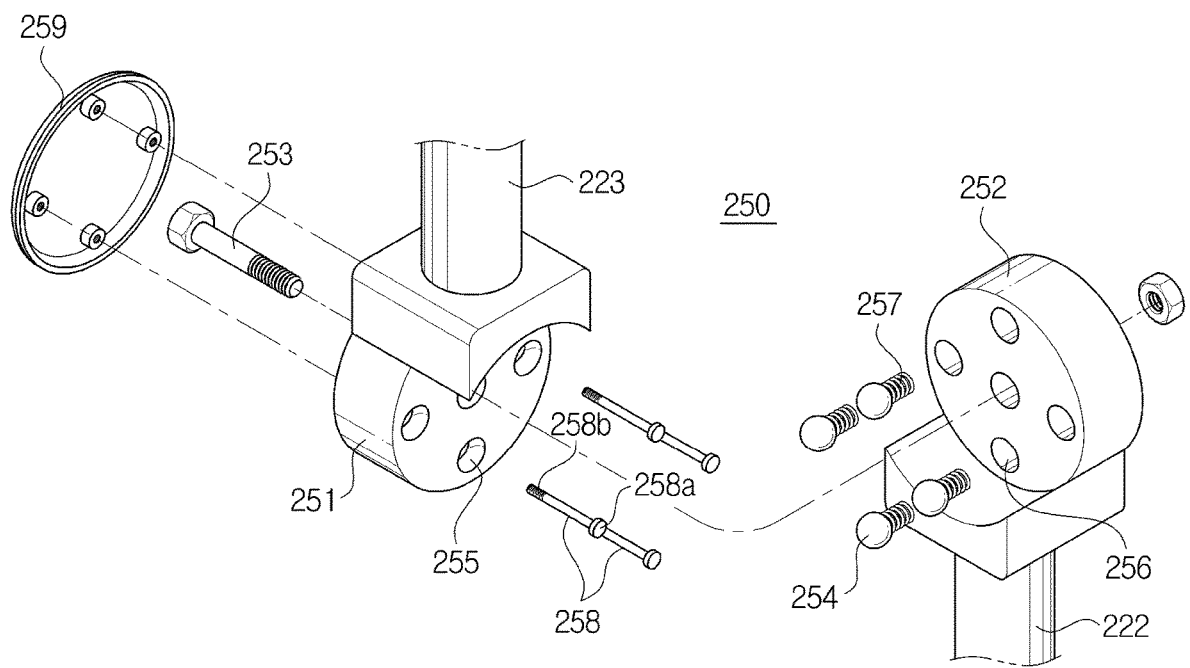
FIG. 8 is an exploded perspective view of a height adjustment device of the personal mobility device according to the second embodiment of the disclosure.
Figure 9:
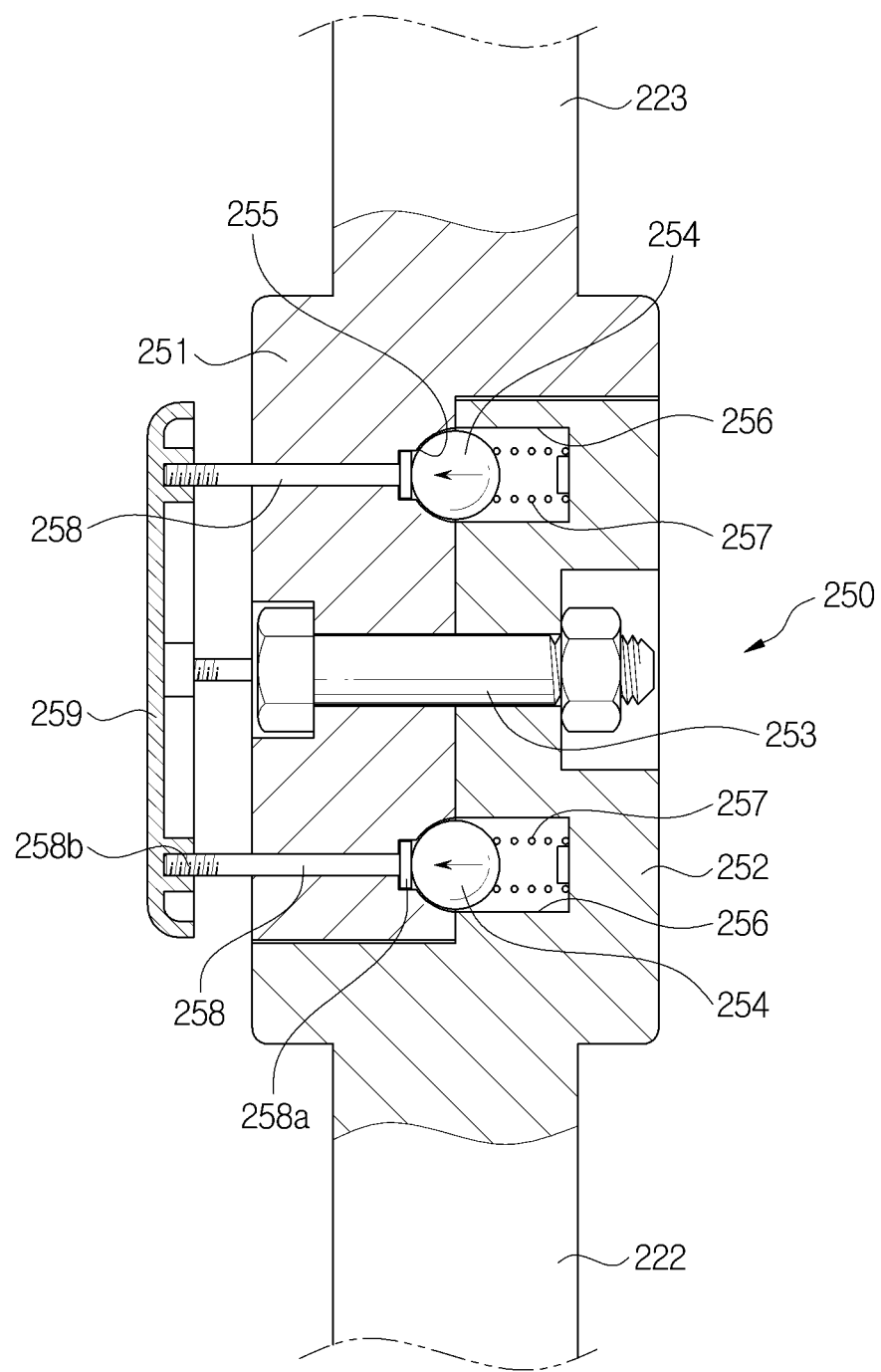
FIG. 9 is a cross-sectional view of the height adjustment device of the personal mobility device according to the second embodiment of the disclosure, illustrating a state in which an upper steering shaft is restrained.
Figure 10:
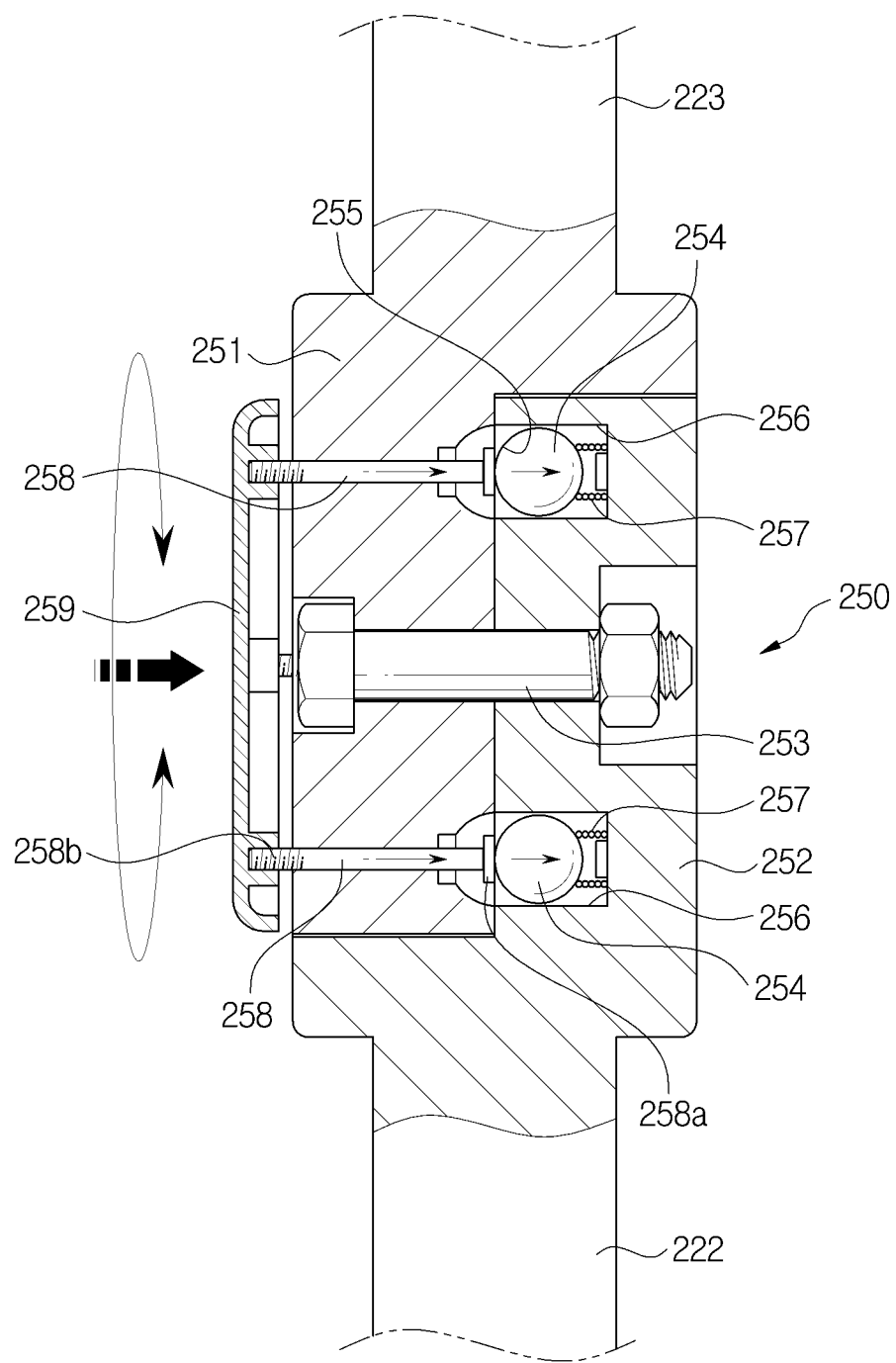
FIG. 10 is a cross-sectional view of the height adjustment device of the personal mobility device according to the second embodiment of the disclosure, illustrating a state in which the restraint of the upper steering shaft is released to enable height adjustment.

Referring to FIGS. 8 to 10, in the second embodiment, the height adjustment device 250 may include a first rotational connection part 251, a second rotational connection part 252, a connection shaft 253, a plurality of locking balls 254, a plurality of restraining grooves 255, a plurality of ball accommodating grooves 256, a plurality of pressing springs 257, a plurality of pressing pins 258, and a pressing member 259.

The first rotational connection part 251 may be provided in a substantially disk shape and is connected to the lower end of the upper steering shaft 223. Like the first rotational connection part 251, the second rotational connection part 252 may be provided in a disk shape and is connected to the upper end of the lower steering shaft 222. The second rotational connection part 252 is installed such that one side surface thereof is in contact with a side surface of the first rotational connection part 251.

The connection shaft 253 is fastened to penetrate through centers of the first and second rotational connection parts 251 and 252 to rotatably connect the first and second rotational connection parts 251 and 252. An axial direction of the connection shaft 253 intersects an axial direction of the lower steering shaft 222. The connection shaft 253 may include a conventional bolt and nut.

The plurality of locking balls 254 is interposed between the first rotational connection part 251 and the second rotational connection part 252 and disposed to be spaced apart from each other in the rotation direction.

The plurality of restraining grooves 255 is formed in a hemispherical shape on the side surface of the first rotational connection part 251 to accommodate and restrain half of the plurality of locking balls 254, respectively. Each of the plurality of ball accommodating grooves 256 is formed to be recessed from the side surface of the second rotational connection part 252 at a position corresponding to each of the plurality of restraining grooves 255 and accommodates each of the plurality of locking balls 254 to be movable forward and backward in the axial direction of the connection shaft 253.

Each of the plurality of pressing springs 257 is installed in each of the plurality of ball accommodating grooves 256 to press each of the plurality of locking balls 254 accommodated in each of the plurality of ball accommodating grooves 256 toward each of the plurality of restraining grooves 255.

The plurality of pressing pins 258 is installed in the first rotational connection part 251 to push and move the locking balls 254 located in the restraining grooves 255 toward the ball accommodating grooves 256 and has one end extending to the outside of the first rotational connection part 251. Each of the plurality of pressing pins 258 is installed to enter from each of the plurality of restraining grooves 255 and protrude to an outer surface of the first rotational connection part 251. Each of the plurality of pressing pins 258 includes a locking part 258a formed at one end to be caught in each of the plurality of restraining grooves 255, and a screw fastening portion 258b formed at the opposite end to be fastened to the pressing member 259.

The pressing member 259 is fastened to the screw fastening portion 258b of the plurality of pressing pins 258 extending outwardly from the first rotational connection part 251. The pressing member 259 may simultaneously press the plurality of pressing pins 258 to move the plurality of locking balls 254 from the plurality of restraining grooves 255 to the plurality of ball accommodating grooves 256.

The second embodiment exemplifies a case in which the first rotational connection part 251 is connected to the upper steering shaft 223 and the second rotational connection part 252 is connected to the lower steering shaft 222, but the positions of the first rotational connection pall 251 and the second rotational connection part 252 may be interchanged. That is, the first rotational connection part 251 may be connected to the lower steering shaft 222, and the second rotational connection part 252 may be connected to the upper steering shaft 223.

As illustrated in FIG. 9, in the height adjustment device 250 of the second embodiment, because the pressing springs 257 press normally the locking balls 254 toward the restraining grooves 255, the locking balls 254 enter into the restraining grooves 255 to be maintained in a caught state. Accordingly, in the state of FIG. 9, the rotation of the upper steering shaft 223 is limited.

As illustrated in FIG. 10, when the user is to adjust the height of the steering handle 221 in the state of FIG. 9, the user presses the pressing member 259 from the side to enter the pressing pins 258 inward to separate the locking balls 254 from the restraining grooves 255. Accordingly, the first rotational connection part 251 is in a rotatable state with respect to the second rotational connection part 252, so that the user may adjust the height by rotating the steering handle 221 up and down.

When the user releases the pressing of the pressing member 259 after adjusting the height of the steering handle 221, as illustrated in FIG. 10, the plurality of locking balls 254 enters the plurality of restraining grooves 255, respectively, and the rotation of the upper steering shaft 223 is limited. Accordingly, the steering handle 221 may be maintained in a height-adjusted state.

Figure 11:
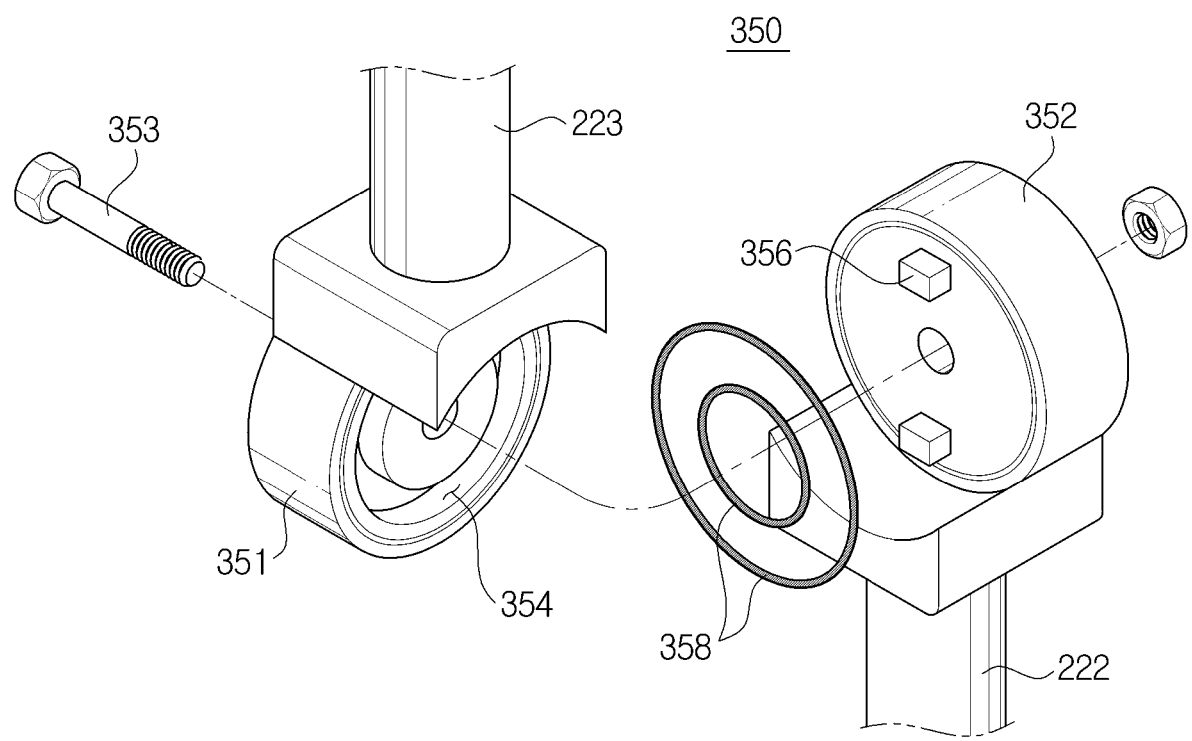
FIG. 11 is an exploded perspective view of a height adjustment device of a personal mobility device according to a third embodiment of the disclosure.
Figure 12:
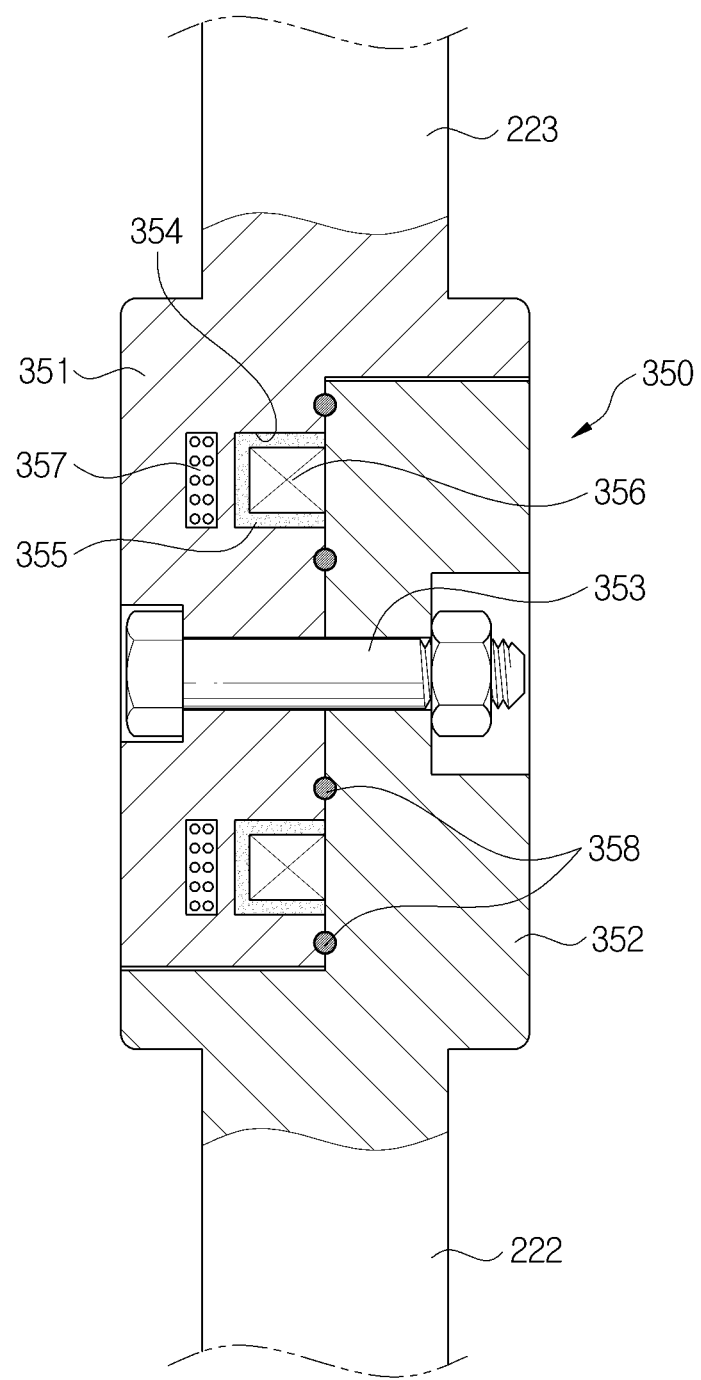
FIG. 12 is a cross-sectional view of the height adjustment device of the personal mobility device according to the third embodiment of the disclosure.
Figure 13:
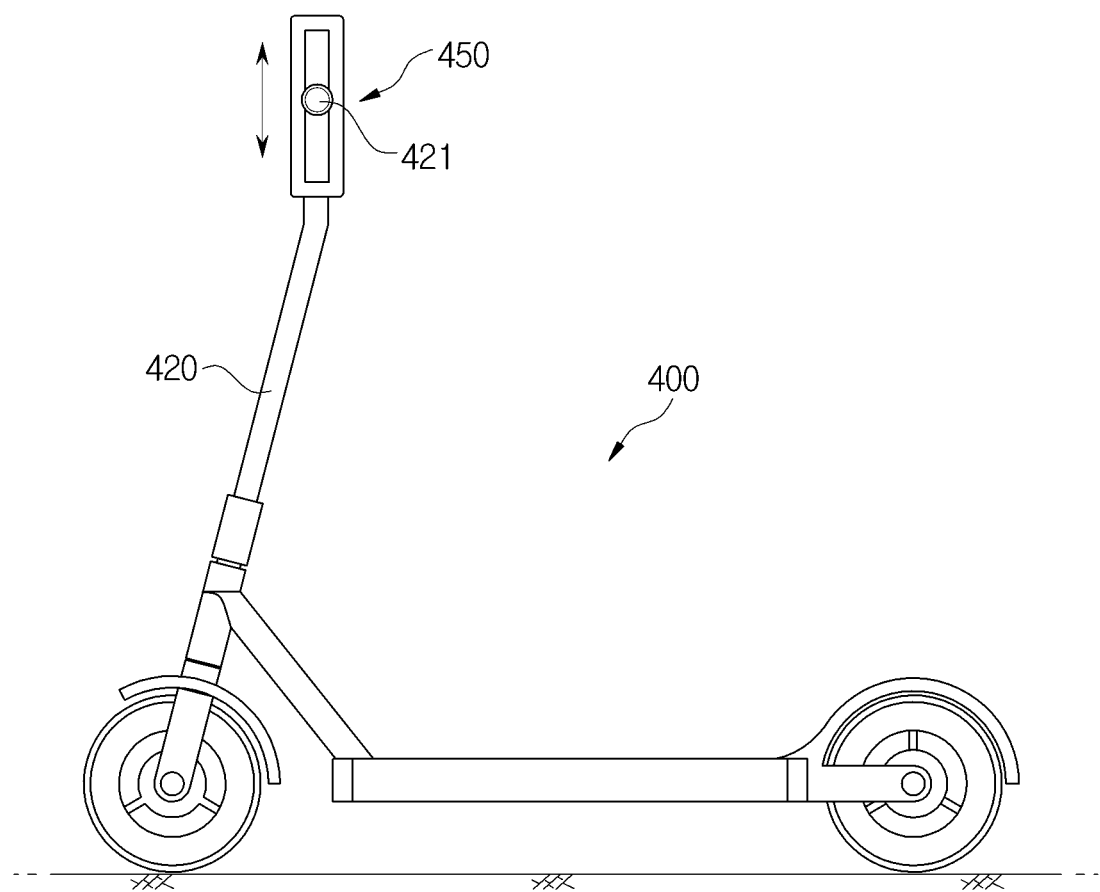
FIG. 13 illustrates a personal mobility device according to a fourth embodiment of the disclosure.

FIGS. 11 and 12 illustrate a height adjustment device 350 of the personal mobility device according to a third embodiment. The height adjustment device 350 of the third embodiment may also be provided at the same position as the height adjustment device 250 of the second embodiment.

As illustrated in FIGS. 11 and 12, the height adjustment device 350 of the third embodiment may include a first rotational connection pall 351, a second rotational connection part 352, a connection shaft 353, a fluid accommodating groove 354, a magneto-rheological (MR) fluid 355, a plurality of protrusions 356, and an excitation coil 357.

The first rotational connection pall 351 may be provided in a substantially disk shape and is connected to the lower end of the upper steering shaft 223. Like the first rotational connection pall 351, the second rotational connection pall 352 may be provided in a disk shape and is connected to the upper end of the lower steering shaft 222. The second rotational connection part 352 is installed such that one side surface thereof is in contact with a side surface of the first rotational connection part 351.

The connection shaft 353 is fastened to penetrate through centers of the first and second rotational connection parts 351 and 352 to rotatably connect the first rotational connection pall 351 and the second rotational connection part 352. An axial direction of the connection shaft 353 intersects the axial direction of the lower steering shaft 222.

The fluid accommodating groove 354 is formed on the side surface of the first rotational connection part 351 such that a side facing the side surface of the second rotational connection pall 352 is open. The fluid accommodating groove 354 is provided around the connection shaft 353 in the form of a circular groove whose center coincides with a center of the connection shaft 353.

The MR fluid 355 is filled in the fluid accommodating groove 354. The MR fluid 355 is a solution containing magnetic particles such as fine iron powder in silicone oil or mineral oil. The MR fluid 355 changes into a solid property as the magnetic particles are arranged in a magnetic field direction when a magnetic field is applied, and changes into a fluid property as the magnetic particles are irregularly dispersed when the magnetic field is released.

Sealing members 358 for preventing leakage of the MR fluid 355 may be installed between the first rotational connection part 351 and the second rotational connection part 352.

The plurality of protrusions 356 protrudes from the second rotational connection part 352 to enter the fluid accommodating groove 354. Because the plurality of protrusions 356 is in a state of entering the fluid accommodating groove 354 filled with the MR fluid 355, the rotation of the first rotational connection part 351 is limited when the MR fluid 355 changes into the solid property.

The excitation coil 357 may be provided around the fluid accommodating groove 354 of the first rotational connection part 351 to provide a magnetic field to the MR fluid 355. The excitation coil 357 may provide a magnetic field to the MR fluid 355 when power is applied so that the MR fluid 355 changes into the solid property. The user may apply power to or release power from the excitation coil 357 by manipulating a switch that controls the application of power to the excitation coil 357.

The height adjustment device 350 of the third embodiment may provide a magnetic field to the MR fluid 355 by normally applying power to the excitation coil 357, and through this, the plurality of protrusions 356 may be constrained by the solidified MR fluid 355. Therefore, in this state, the rotation of the upper steering shaft 223 is limited.

When the user wants to adjust the height of the steering handle 221, the user manipulates the switch to release the power application of the excitation coil 357, so that the MR fluid 355 may change into the fluid property. Accordingly, because the first rotational connection part 351 is in a rotatable state with respect to the second rotational connection part 352, the user may adjust the height by rotating the steering handle 221 up and down.

The third embodiment exemplifies a case in which the first rotational connection part 351 is connected to the upper steering shaft 223 and the second rotational connection part 352 is connected to the lower steering shaft 222, but the positions of the first rotational connection part 351 and the second rotational connection part 352 may be interchanged. That is, the first rotational connection part 351 may be connected to the lower steering shaft 222, and the second rotational connection part 352 may be connected to the upper steering shaft 223.

FIGS. 13 to 16 illustrate a personal mobility device 400 according to a fourth embodiment.

In the personal mobility device 400 of the fourth embodiment, a height adjustment device 450 is provided at an upper portion of a steering shaft 420. The height adjustment device 450 supports a steering handle 421 and at the same time allows vertical movement of the steering handle 421 when necessary to adjust a height of the steering handle 421.

Figure 14:
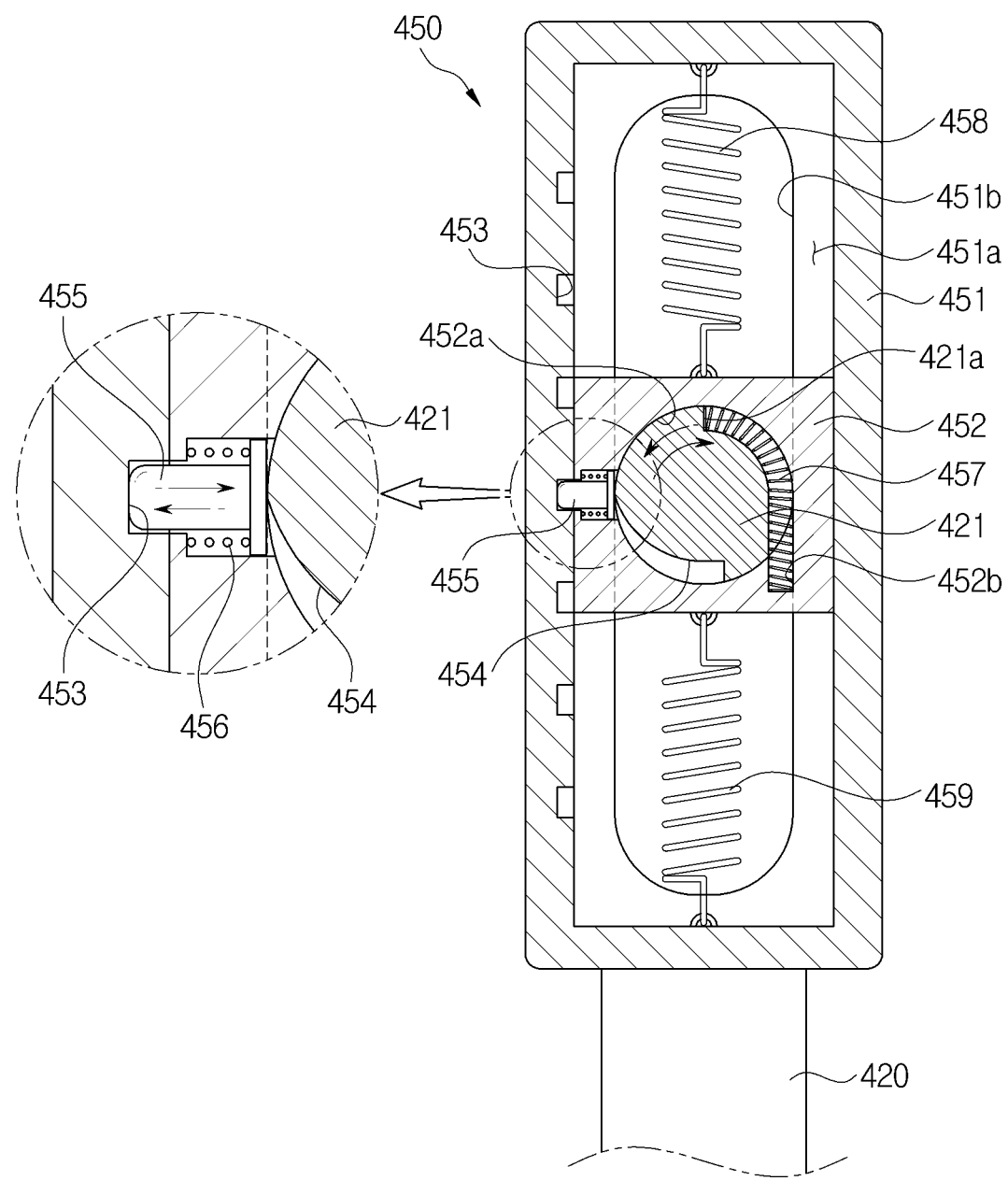
FIG. 14 is a cross-sectional view of the height adjustment device of the personal mobility device according to the fourth embodiment of the disclosure, illustrating a state in which ascending and descending of a steering handle are restricted.
Figure 15:
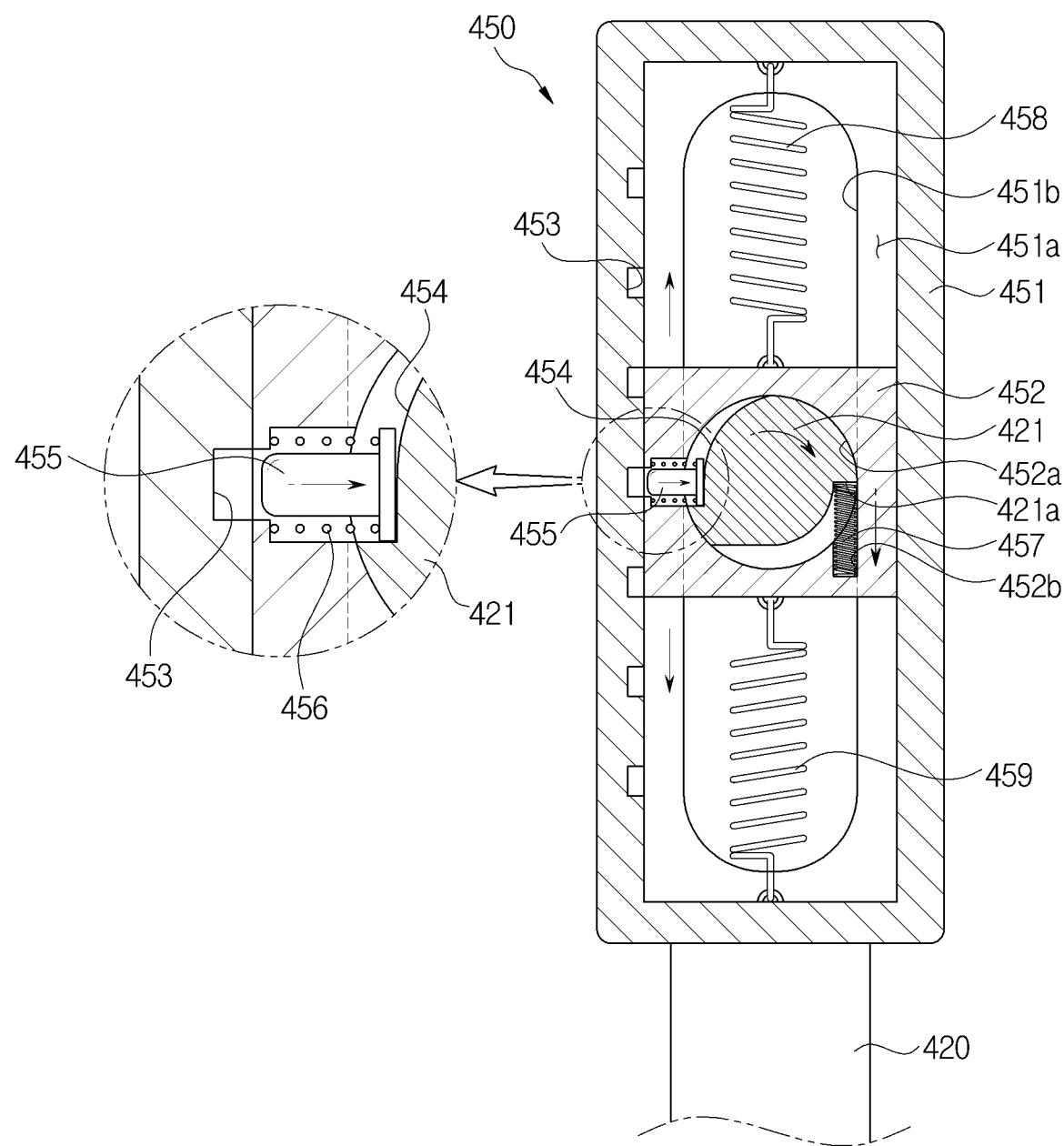
FIG. 15 is a cross-sectional view of the height adjustment device of the personal mobility device according to the fourth embodiment of the disclosure, illustrating a state in which the ascending and descending of the steering handle are enabled.
Figure 16:
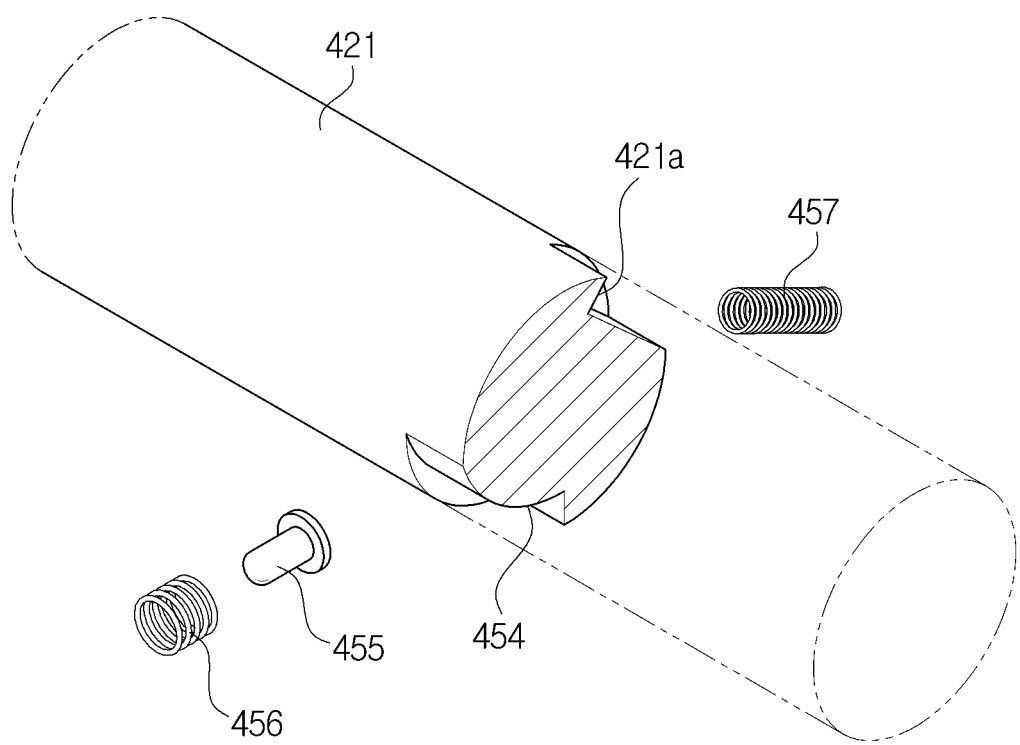
FIG. 16 is a perspective view illustrating a cam groove, a locking member, a first restoration spring, and a second restoration spring in the height adjustment device of the personal mobility device according to the fourth embodiment of the disclosure.

Referring to FIGS. 14 to 16, the height adjustment device 450 of the fourth embodiment may include a guide rail 451, a lifting member 452, a plurality of locking grooves 453, a cam groove 454, a locking member 455, a first restoration spring 456, a second restoration spring 457, a first traction spring 458, and a second traction spring 459.

The guide rail 451 is fixed to an upper end of the steering shaft 420 and extends upward from the upper end of the steering shaft 420. A sliding groove 451a extending in a vertical direction is provided inside the guide rail 451, and slots 451b elongated vertically are provided on opposite sides of the guide rail 451 for installation and lifting of the steering handle 421.

The lifting member 452 is coupled to the sliding groove 451a of the guide rail 451 and may ascend and descend along the sliding groove 451a. The lifting member 452 may be provided in a substantially hexahedral shape and has a handle coupling hole 452a through which the steering handle 421 penetrates in the transverse direction.

The steering handle 421 is coupled to the handle coupling hole 452a of the lifting member 452. The steering handle 421 extends to opposite sides of the lifting member 452 in a state of penetrating through the lifting member 452 in the transverse direction to be rotatably supported in the handle coupling hole 452a of the lifting member 452. The steering handle 421 may be supported on the lifting member 452 so as not to be separated in the transverse direction and may ascend and descend together with the lifting member 452.

The plurality of locking grooves 453 is formed on an inner surface of the sliding groove 451a in contact with a side surface of the lifting member 452 and arranged in the vertical direction in a state of being spaced apart from each other.

The cam groove 454 is formed on an outer surface of the steering handle 421 positioned inside the lifting member 452. The cam groove 454 may be provided in a form that gradually increases in depth from a surface of the steering handle 421 in a rotational direction.

The locking member 455 is installed to be movable forward and backward on the lifting member 452 and may protrude toward the plurality of locking grooves 453 to be caught in one of the plurality of locking grooves 453. The locking member 455 has one end in contact with the cam groove 454 and the other end extending toward the locking groove 453. Because the locking member 455 maintains a state of being in contact with the cam groove 454, when the user rotates the steering handle 421, the locking member 455 may move forward and backward to be caught in or released from the locking grooves 453.

The first restoration spring 456 is installed outside the locking member 455 in the inside of the lifting member 452. The first restoration spring 456 moves the locking member 455 toward the steering handle 421 on which the cam groove 454 is located.

The second restoration spring 457 is installed between the lifting member 452 and the steering handle 421 on the opposite side of the locking member 455. The second restoration spring 457 may be provided such that one end thereof is supported in a state of being accommodated in the first spring groove 421a formed on the outer surface of the steering handle 421 and the other end thereof is supported in a state of being accommodated in the second spring groove 452b formed on the lifting member 452. The second restoration spring 457 may include a compression coil spring and may rotate the steering handle 421 in a direction of protruding the locking member 455 to maintain the locking member 455 in a state of being caught in the locking groove 453.

The first traction spring 458 connects an upper side of the guide rail 451 and the lifting member 452 to pull the lifting member 452 upward. The second traction spring 459 connects a lower side of the guide rail 451 and the lifting member 452 to pull the lifting member 452 downward. Therefore, because the lifting member 452 is provided such that an upper side thereof is supported by the first traction spring 458 and a lower side thereof is supported by the second traction spring 459, the user may smoothly move the steering handle 421 up and down.

As illustrated in FIG. 14, in the height adjustment device 450 of the fourth embodiment, because the second restoration spring 457 rotates the steering handle 421 counterclockwise to protrude the locking member 455 so as to be caught in the locking groove 453, the lifting member 452 does not move up and down. Accordingly, the steering handle 421 does not move up and down in the state of FIG. 14.

When the user wants to adjust the height of the steering handle 421 in the state of FIG. 14, as illustrated in FIG. 15, the user rotates the steering handle 421 clockwise. Through this, the locking member 455 is released as the locking member 455 enters the inside of the lifting member 452 by an elastic force of the first restoration spring 456. Therefore, the user may adjust the height of the steering handle 421 by moving the steering handle 421 upward or downward in this state.

When the user releases the steering handle 421 after adjusting the height of the steering handle 421 in the state of FIG. 15, the steering handle 421 rotates (counterclockwise rotation) to return to the original state again by an elastic force of the second restoration spring 457, so that the locking member 455 enters the locking groove 453 to be caught in the locking groove 453 as illustrated in FIG. 14. Therefore, the steering handle 421 may maintain the height-adjusted state.

As is apparent from the above, a personal mobility device according to an embodiment of the disclosure can easily adjust a height of a steering handle depending on a physical condition of a user.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

What is claimed is:

1. A personal mobility device comprising:
a height adjustment device configured to adjust a height of a steering handle;
a wireless communication module configured to communicate with a control server through a wireless network; and
a controller configured to control the height adjustment device to adjust the height of the steering handle based on user body information transmitted from the control server through authentication, the user body information having been received at the control server from a user terminal.

2. The personal mobility device according to claim 1, wherein the height adjustment device comprises:
a lower steering shaft connected to a front wheel side;
an upper steering shaft disposed above the lower steering shaft and configured to enable lifting, the upper steering shaft having an upper end to which the steering handle is connected; and
a lifting driving device installed at connection portions between the lower steering shaft and the upper steering shaft and configured to ascend and descend the upper steering shaft.

3. The personal mobility device according to claim 2, wherein the lifting driving device comprises:
a lifting screw shaft located in the upper steering shaft and configured to be screwed to the upper steering shaft; and
a lifting motor installed on the lower steering shaft and configured to rotate the lifting screw shaft in a forward or reverse direction.

4. The personal mobility device according to claim 1, further comprising an image sensor configured to measure user body information.

5. The personal mobility device according to claim 4, wherein the controller is further configured to control the height adjustment device to adjust the height of the steering handle based on the user body information measured by the image sensor.

6. The personal mobility device according to claim 4, wherein the height adjustment device comprises:
a lower steering shaft connected to a front wheel side;
an upper steering shaft disposed above the lower steering shaft and configured to enable lifting, the upper steering shaft having an upper end to which the steering handle is connected; and
a lifting driving device installed at connection portions between the lower steering shaft and the upper steering shaft, the lifting driving device configured to ascend and descend the upper steering shaft.

7. The personal mobility device according to claim 6, wherein the lifting driving device comprises:
a lifting screw shaft located in the upper steering shaft and configured to be screwed to the upper steering shaft; and a lifting motor installed on the lower steering shaft and configured to rotate the lifting screw shaft in a forward or reverse direction.

8. The personal mobility device according to claim 1, further comprising:
a lower steering shaft connected to a front wheel side; and
an upper steering shaft having a lower side connected to the lower steering shaft and an upper side connected to the steering handle;
wherein the height adjustment device rotatably connects a lower end of the upper steering shaft to an upper end of the lower steering shaft, the height adjustment device configured to allow rotation of the upper steering shaft or limit the rotation of the upper steering shaft to adjust the height of the steering handle.

9. The personal mobility according to claim 8, wherein the height adjustment device comprises:
a first rotational connection part provided on one of the lower steering shaft and the upper steering shaft;
a second rotational connection part provided on the other of the lower steering shaft and the upper steering shaft and having one side surface in contact with a side surface of the first rotational connection part;
a connection shaft provided to rotatably fasten the first rotational connection part and the second rotational connection part and having an axis intersecting an axis of the lower steering shaft;
a plurality of locking balls interposed between the first rotational connection part and the second rotational connection part;
a plurality of restraining grooves formed in a hemispherical shape on the side surface of the first rotational connection part and configured to accommodate and restrain a portion of the plurality of locking balls;
a plurality of ball accommodating grooves formed on the second rotational connection part at positions corresponding to the plurality of restraining grooves and configured to accommodate the plurality of locking balls to be movable forward and backward;
a plurality of pressing springs installed in the plurality of ball accommodating grooves and configured to press the plurality of locking balls toward the plurality of restraining grooves;
a plurality of pressing pins installed in the first rotational connection part and configured to push and move the plurality of locking balls located in the plurality of restraining grooves toward the plurality of ball accommodating grooves, each of the plurality of pressing pins having an end extending to an outside of the first rotational connection part; and
a pressing member coupled to the ends of the plurality of pressing pins.

10. The personal mobility according to claim 8, wherein the height adjustment device comprises:
a first rotational connection part provided on one of the lower steering shaft and the upper steering shaft;
a second rotational connection part provided on the other of the lower steering shaft and the upper steering shaft and having one side surface in contact with a side surface of the first rotational connection part;
a connection shaft provided to rotatably fasten the first rotational connection part and the second rotational connection part and having an axis intersecting an axis of the lower steering shaft;
a circular fluid accommodating groove formed on the side surface of the first rotational connection part such that a side thereof facing the side surface of the second rotational connection part is open and having a center coincident with a center of the connection shaft;
a magneto-rheological (MR) fluid accommodated in the circular fluid accommodating groove;
a plurality of protrusions protruding from the second rotational connection part to enter the circular fluid accommodating groove; and
an excitation coil provided on the first rotational connection part to provide a magnetic field to the MR fluid.

11. The personal mobility according to claim 10, wherein the MR fluid is configured to change into a solid property to limit a movement of the plurality of protrusions when power is applied to the excitation coil to generate the magnetic field.

12. The personal mobility of claim 1, further comprising:
a guide rail fixed to an upper portion of a steering shaft and having a sliding groove formed in a vertical direction;
a lifting member coupled to the guide rail and configured to ascend and descend along the sliding groove, wherein the steering handle extends to opposite sides of the lifting member in a state of penetrating through the lifting member in a transverse direction to be rotatably supported on the lifting member;
a plurality of locking grooves formed on an inner surface of the sliding groove in contact with a side surface of the lifting member to be spaced apart from each other in the vertical direction;
a cam groove formed on an outer surface of the steering handle inside the lifting member;
a locking member installed on the lifting member and configured to be movable forward and backward by a rotation of the steering handle to be caught in one of the plurality of locking grooves and having one end in contact with the cam groove;
a first restoration spring installed outside the locking member and configured to move the locking member toward the steering handle; and
a second restoration spring installed between the lifting member and the steering handle and configured to rotate the steering handle in a direction of protruding from the locking member.

13. The personal mobility according to claim 12, further comprising:
a first traction spring provided to connect an upper side of the guide rail and the lifting member, the first traction spring being configured to pull the lifting member upward; and
a second traction spring provided to connect a lower side of the guide rail and the lifting member, the second traction spring being configured to pull the lifting member downward.

14. A control method of a personal mobility device comprising a height adjustment device to adjust a height of a steering handle and a wireless communication module provided to communicate with a control server through a wireless network, the control method comprising:
determining whether a user is authenticated through communication with the control server;
determining whether there is user body information input by the user through a user terminal when it is determined the user is authenticated; and
controlling the height adjustment device to adjust the height of the steering handle based on the user body information input by the user through the user terminal when it is determined there is the user body information input by the user through the user terminal.

15. The control method according to claim 14, wherein the personal mobility device further comprises an image sensor to measure a body of the user.

16. The control method according to claim 15, further comprising measuring the body of the user with the image sensor when it is determined there is no user body information input by the user.

17. The control method according to claim 16, further comprising controlling the height adjustment device to adjust the height of the steering handle based on the body of the user measured by the image sensor when it is determined there is no user body information input by the user.

18. The control method according to claim 14, wherein determining whether the user is authenticated comprises:
- receiving an authentication request at the control server from the user terminal;
- determining whether the user is authenticated at the control server; and
- transmitting a result indicating whether the user is authenticated from the control server to the personal mobility device.

19. A control method of a personal mobility device, the control method comprising:
- receiving an authentication request of a user at a control server, the authentication request being received from a user terminal;
- authenticating the user at the control server;
- transmitting an authentication result from the control server to the personal mobility device, the authentication result indicating that the user has been authenticated;
- receiving user body information at the control server, the user body information being received from the user terminal; and
- controlling a height adjustment device of the personal mobility device to adjust the height of a steering handle of the personal mobility device based on the user body information received from the user terminal.

* * * * *